United States Patent [19]

Dawes

[11] Patent Number: 4,967,340
[45] Date of Patent: Oct. 30, 1990

[54] ADAPTIVE PROCESSING SYSTEM HAVING AN ARRAY OF INDIVIDUALLY CONFIGURABLE PROCESSING COMPONENTS

[75] Inventor: Robert L. Dawes, Allen, Tex.

[73] Assignee: E-Systems, Inc., Dallas, Tex.

[21] Appl. No.: 273,155

[22] Filed: Nov. 18, 1988

Related U.S. Application Data

[63] Continuation of Ser. No. 743,920, Jun. 12, 1985, abandoned.

[51] Int. Cl.$^5$ .............................................. G06F 15/16
[52] U.S. Cl. ............................... 364/200; 364/232.2; 364/229.4; 364/231.8
[58] Field of Search .................... 364/200, 900, 728

[56] References Cited

U.S. PATENT DOCUMENTS

| | | | |
|---|---|---|---|
| 3,284,780 | 11/1966 | Clapper | 364/900 |
| 3,303,473 | 2/1967 | Clapper | 364/900 |
| 3,317,901 | 5/1967 | Clapper | 364/900 |
| 3,333,249 | 7/1967 | Clapper | 364/900 |
| 3,348,214 | 10/1967 | Barbetta | 364/900 |
| 3,374,470 | 3/1968 | Rohland | 364/900 |
| 3,411,138 | 11/1968 | Andreae et al. | 364/900 |
| 3,533,072 | 10/1970 | Clapper | 166/303 |
| 3,548,385 | 12/1970 | Tunis | 364/900 |
| 3,579,191 | 5/1971 | Andreae et al. | 340/172.5 |
| 3,665,416 | 5/1972 | Hikosaka | 340/172.5 |
| 3,757,312 | 9/1973 | Shore et al. | 340/173 AM |
| 3,950,733 | 4/1976 | cooper et al. | 340/172.5 |
| 4,156,907 | 5/1979 | Rawlings et al. | 364/200 |
| 4,254,474 | 3/1981 | Cooper et al. | 364/900 |
| 4,365,292 | 12/1982 | Barnes et al. | 364/200 |
| 4,384,273 | 5/1983 | Ackland et al. | 382/34 |
| 4,442,543 | 4/1984 | Sternberg et al. | 382/49 |
| 4,484,346 | 11/1984 | Sternberg et al. | 382/27 |
| 4,484,349 | 11/1984 | McCubbrey | 382/49 |
| 4,493,048 | 1/1985 | Kung et al. | 364/754 |
| 4,580,215 | 4/1986 | Morton | 364/200 |
| 4,591,980 | 5/1986 | Huberman et al. | 364/200 |
| 4,593,367 | 6/1986 | Slack et al. | 364/513 |
| 4,601,055 | 7/1986 | Kent | 382/49 |
| 4,606,069 | 8/1986 | Johnsen | 382/56 |
| 4,701,876 | 10/1987 | McCanny et al. | 364/728 |

OTHER PUBLICATIONS

J. Blackner et al., "A 200 MOPS Systolic Processor," SPIE Conference Proceedings vol. 298, Real Time Signal Processing IV, Aug. 1981.

Primary Examiner—Thomas M. Heckler
Attorney, Agent, or Firm—Harold E. Meier

[57] ABSTRACT

An adaptive processing system for real-time signal processing of one or more input signals in parallel-pipeline fashion is provided. According to the invention, the adaptive processing system includes a random access processor having an array of processing elements each being individually configurable. A man-machine interface receives instructions defining how an input signal is to be processed by the random access processor. A configuration controller responsive to the interface is used to generate configuration data defining a configuration of the random access processor, and data flow between contiguous processing elements thereof, for enabling processing of the input signals according to the insructions. The random access processor is configurable into one or more individually addressable processing arrays which may perform linear or nonlinear operations on an input signal.

33 Claims, 6 Drawing Sheets

ADAPTIVE PROCESSING SYSTEM HAVING AN ARRAY OF INDIVIDUALLY CONFIGURABLE PROCESSING COMPONENTS

Cross Reference to Related Applications

This application is a continuation of application Ser. No. 743,920, filed June 12, 1985, now abandoned.

TECHNICAL FIELD

The present invention relates to signal processing techniques, and more particularly to an adaptive processing system having an array of individually configurable processing elements.

BACKGROUND OF THE INVENTION

Various signal processing applications require linear or nonlinear operations on large amounts of data at high data rates. Such operations involve very intensive and repetitive calculations, and thus utilize significant memory allocation and processor time. Conventional computer architectures, which perform computations on data and instructions delivered to and from memory through a single link, are unable to process these large amounts of data efficiently, and thus the overall cost and complexity of the signal processing application can be prohibitive.

This problem has been ameliorated through the development of parallel-pipeline processing architectures, or "systolic processors." A systolic processor generally includes an array of structurally and functionally identical processing elements or "cells." Portions of data fetched from memory are processed by the processing elements in parallel fashion. Systolic processors offer high computational throughput for a given memory bandwidth. Moreover, the modularity of the processing cells facilitates economic implementation of otherwise costly signal processing applications. A conventional systolic processor of the prior art is described in the publication entitled *The ESL Systolic processor for Signal and Image Processing*, by Yen et al., pp. 265-272, 1981 IEEE Computer Society Workshop on CAPAIDM.

Notwithstanding the advantages of prior art systolic processors, these devices are limited in their functional capability by certain physical constraints. In particular, the various processing elements of the array are typically hard wired together, depending on the desired signal processing application. The requirement that the processing elements be hard-wired limits the types of operations performable by the array to linear transformations, such as vector inner products, matrix multiplication and convolutions. Complex nonlinear operations, however, are not readily implemented by the array. Such operations require transfer of data to a central processor for nonlinear calculations, thus increasing the cost and complexity of the signal processing application.

There is therefore a need for an improved systolic processing architecture which obviates transfer of data to an external processor for nonlinear calculations and which provides economical implementation of both linear and nonlinear signal processing operations.

BRIEF SUMMARY OF THE INVENTION

According to the present invention, an adaptive processing system is provided for real-time signal processing of one or more input signals in parallel-pipeline fashion. The system includes a random access processor having an array of individually configurable processing elements. A man-machine interface receives instructions from a system operator defining how an input signal is to be processed by the array. A configuration controller, responsive to the man-machine interface, includes a compiler and a central processing unit (CPU). The configuration controller generates configuration data defining a configuration of the array, and the data flow between contiguous processing elements thereof, to enable processing of the input signals according to the operator input instructions.

The adaptive processing system also includes a multiport random access memory (RAM) for transferring the one or more input signals to and from the array. High speed parallel interface circuits are also provided at the input and output ports of the system. These circuits perform appropriate pre-processing and post-processing tasks on the signals, including direct memory access (DMA) to and from the multiport RAM. The system further includes an array processor which performs high-speed computation of time-varying filter coefficients for use by the random access processor.

In operation, the adaptive processing system is tunable to individual signals or classes of signals by means of the compiler of the configuration controller. The compiler translates high-level parametric descriptions of a class of signals of interest input via the man-machine interface, into a program which controls the central processing unit of the configuration controller. The CPU then generates the appropriate configuration data for configuring the random access processor.

In the preferred embodiment of the invention, each processing element of the array includes first, second and third programmable switches, the states of which are controlled by the configuration data. These switches facilitate the dynamic configurability of the array, and thus increase the overall functional capability of the random access processor. To perform linear and/or nonlinear operations on signals, each of the processing elements includes a multiplier having a first input connected to an output of the first programmable switch, a second input connected to an output of the second programmable switch through a latch, and an output. Each processing element also includes an adder having a first input connected to the output of the multiplier, a second input connected to an output of the second programmable switch, and an output connected to an input of the third programmable switch. A delay element is also provided in each processing element for delaying transmission of the input signal being processed to a next contiguous processing element in the array. The delay element includes an input connected to the output of the first programmable switch, a control terminal for receiving configuration data for setting an amount of delay of the delay element, and an output connected to the next contiguous processing element in the array. Contiguous processing elements in the array are interconnected by the programmable switches to effect changes in the array configuration.

In operation, the array of processing elements is partitioned by the configuration data into a number of of processors analogous to the way in which a random access memory (RAM) is partitioned and declared by application programs in a single processor computer architecture. Such partitions are accomplished by loading each processing element with the configuration data, which determines the way in which signals are clocked into a contiguous subarray of the processing elements.

BRIEF DESCRIPTION OF THE DRAWINGS

For a more complete understanding of the present invention and the advantages thereof, reference is now made to the following Detailed Description taken in conjunction with the accompanying Drawings in which.

DETAILED DESCRIPTION

Figure 1:
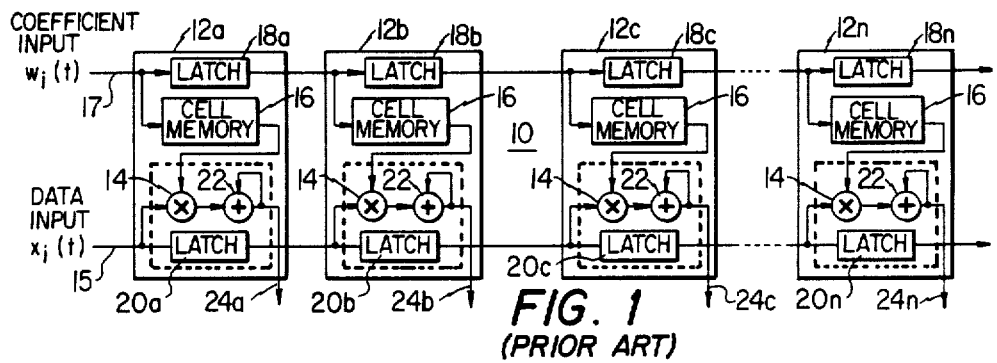
FIG. 1 is a block diagram of a prior art systolic processor having an array of processing elements.

With reference now to the FIGURES wherein like reference characters designate like or similar elements throughout the several views, FIG. 1 is a block diagram of a systolic processor 10 of the prior art having an array of processing elements 12a...12n. Each processing element 12a...12n has an identical structure and function to facilitate parallel-pipeline processing of data fetched from memory. For the n-cell systolic processor 10 shown in FIG. 1, computational throughput is increased "n" times over conventional single processor architectures, although the size of associated memory remains fixed.

The systolic processor 10 of FIG. 1 defines a linear array which may be used for performing linear operations on data, e.g., convolution and matrix multiplication. Because such signal processing operations typically involve "multiply-and-accumulate" type of expressions, processing elements 12a...12n each include appropriate multiplication and addition elements. With reference to FIG. 1, each processing element 12a...12n includes a multiplier 14 having a first input for receiving a data vector $x_i(t)$ via line 15, and a second input for receiving a coefficient vector $w_i(t)$ via line 17. The elements of the coefficient vector $w_i(t)$ may be initially stored in a cell memory 16 of each processing element 12a...12n. The data and coefficient elements $x_i$ and $w_i$ of the data and coefficient vectors, respectively, remain paired as they move through the systolic processor 10 at a rate of one element per clock cycle. This is achieved by the use of a first latch 18a...18n in each processing element for receiving a coefficient vector element $w_i$, and a second latch 20a...20n for receiving a data vector element $x_i$. To accumulate the products produced by the multiplier 14, an adder 22 is provided in each processing element 12a...12n, a first input thereof connected to the output of the multiplier 14, and a second input thereof connected to the output of the adder 22. Although not shown in detail in FIG. 1, a shift register or other storage device may be connected in the adder feedback loop. The output of each adder 22 forms one of the outputs 24a...24n, which together form a composite output of the systolic processor 10.

As seen in FIG. 1, each processing element 12a...12n is connected to a next contiguous processing element in the array 10 through the latches 18 and 20. This structure facilitates the parallel-pipeline processing of the data and coefficient vectors. The systolic processor 10 of FIG. 1 may be expanded to provide an n-dimensional linear array for generating multi dimensional convolutions or other linear operations.

The systolic processor 10 of FIG. 1 is limited in its functional capability by certain physical consfraints. The latches 18a and 20a of processing element 12a are hard-wired to the latches 18b and 20b, respectively, in the contiguous processing element 12b. The remainder of the processing elements are typically interconnected in a similar fashion. Because of this structure, the data and coefficient vectors are clocked from one processing element to the next in only one way, and the data vector may only be fed to the array at the first processing element 12a. These constraints effectively limit the systolic processor 10 to linear operations, e.g inner products, matrix transformations and convolutions, depending on the initial hard wired configuration between processing elements. Nonlinear operations on an input signal, however, are not performable without first transferring data to a central processor for nonlinear calculations.

Figure 2:
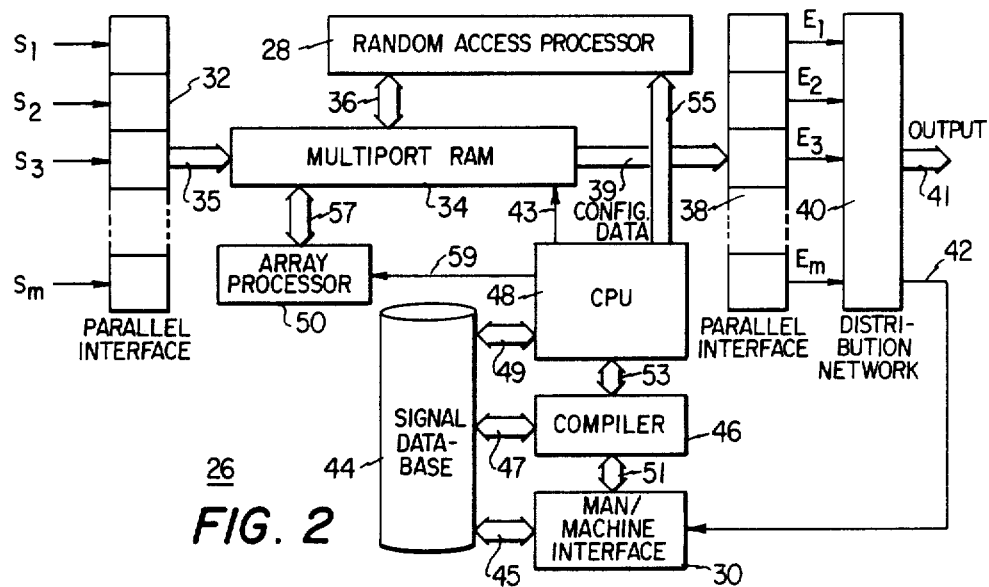
FIG. 2 is a block diagram of the preferred embodiment of the adaptive processing system of the present invention for parallel pipeline processing of one or more input signals.

This limitation of prior art systolic processors is ameliorated by the adaptive processing system of the present invention having an array of individually configurable processing elements With reference now to FIG. 2, a block diagram of the adaptive processing system 26 of the present invention is shown. The adaptive processing system 26 provides real-time signal processing of one or more input signals in parallel-pipeline fashion. As will be described in more detail, such processing is accomplished by a random access processor 28 having an array of processing elements each being individually configurable. A man-machine interface 30 allows a system operator to communicate with the remainder of the adaptive processing system 26. The man machine interface 30 preferably comprises a keyboard/display work station through which the system operator inputs instructions to the processing system 26, and for displaying processing results. These operator-input instructions define how the one or more input signals are to be processed by the system 26 As an example, the adaptive processing system 26 can be connected to receive a plurality of input signals from antenna elements in an antenna array. If the system operator desires to demodulate each received signal and then convolve one or more of these signals with a reference signal, instructions are input through the man machine interface 30 defining these signal processing tasks. Preferably, such instructions are input via a conventional prompting scheme controlled by an appropriate computer software routine.

With reference to FIG. 2, the one or more input signals, designated $S_i...S_m$, are input to a first parallel interface circuit 32 of the adaptive processing system 26. The parallel interface circuit 32 provides various pre-processing functions such as analog-to-digital (A/D) conversion and multiplexing of the digitized input signals, and also provides direct memory access (DMA) into a multiport random access memory (RAM) 34 via bus 35. The multiport RAM 34 includes dedicated portions for directly storing the pre-processed input signal(s). As will be described in more detail below, the input signals are transferred to and from the random access processor 28 via bus 36 where they are processed. According to the invention, the multiport RAM 34 also acts as a signal path bus, serving to transfer the signals processed by the random access processor 28 to a second parallel interface circuit 38 via bus 39. The second parallel interface circuit 38 performs various post-processing functions such as digital-to-analog conversion and demultiplexing. The processed signals, designated $E_l...E_m$, are then transferred to a distribution network 40 and output from the adaptive processing system 26 via output bus 41. The distribution network 40 also connects selected outputs via line 42 to the man-machine interface 30 to display processing results to the system operator.

The adaptive processing system 26 includes circuitry for receiving the instructions from the man machine interface 30 and in response thereto, controlling the random access processor 28. To this end, the man-machine interface 30 is connected to a signal database 44 via bus 45. Signal database 44 stores a set of all signal parameters which may be processed by the adaptive processing system 26. Data stored in the signal database may be transferred to a compiler 46 via bus 47 or to and from a central processing unit (CPU) 48 via bus 49. The compiler 46 and CPU 48 comprise a configuration controller of the adaptive processing system 26. In operation, the compiler 46 accepts the operator input instructions from the man machine interface 30 via bus 51, interprets these instructions in terms of the set of all signal parameters stored in the signal database 44, and in response thereto determines what type of signal processing function is required. The compiler 46 also determines the configuration of the random access processor 28 necessary to estimate unknown or unspecified signal parameters such that the input signal(s) can be sufficiently characterized for operator requirements and/or subsequent processing.

Once the configuration of the random access processor 28 is determined, the compiler 46 outputs control data via bus 53 to the CPU 48. In response thereto, CPU 48 issues "configuration data" defining a configuration of the random access processor 28 to enable processing of the one or more input signals according to the instructions input by the system operator. The configuration data is supplied from the CPU 48 to the random access processor 28 via bus 55. As will be described in more detail below, by defining the configuration of the random access processor 28, the configuration data controls data flow between contiguous processing elements thereof to facilitate linear and nonlinear operations on the input signal(s). CPU 48 also controls the signal flow through the multiport RAM 34 via control line 43

The adaptive processing system 26 also includes an array processor 50 which performs high-speed computation of time varying filter coefficients for use by the random access processor 28. These filter coefficients are transferred to the multiport RAM 34 via bus 57, and then to the random access processor 28 via bus 36. The array processor 50 is controlled by the central processing unit 48 by control data sent thereto via line 59. The multiport RAM 34 is also used as a general purpose storage for the array processor 50 and the CPU 48.

The adaptive processing system 26 is "tuned" to individual signals or classes of signals by means of the compiler 46, which translates high-level parametric descriptions of the class of signals of interest input via the man-machine interface 30, into a program which controls the CPU 48. In response thereto, the CPU 48 generates the configuration data which is used to configure the random access processor 28. For example, the operator may input a request via the man-machine interface 30 to process all correlated waveforms in a certain frequency band, or request processing of a specific waveform at a certain frequency. The outputs of the random access processor 28 are then estimates of a subset of the unknown parameters of the specific class of signals, with the size of the estimated subset limited only by the number of processing elements in the random access processor 28.

Figure 3:
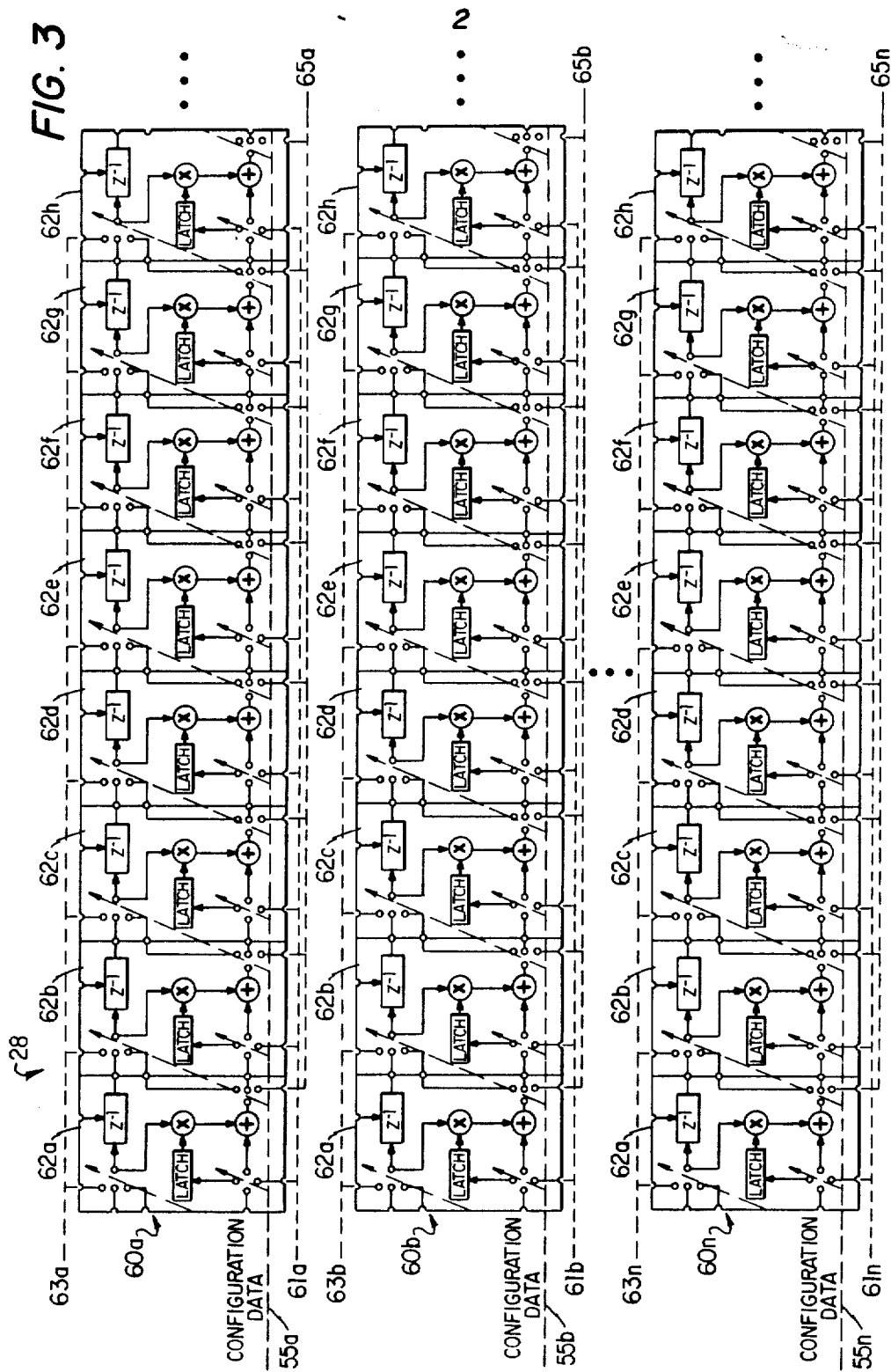
FIG. 3 is a detailed block diagram of the random access processor of FIG. 2 having individually configurable processing elements.

Referring now to FIG. 3, a block diagram of the random access processor 28 of FIG. 2 is shown in detail. The random access processor 28 includes a plurality of individually addressable and configurable processing elements forming rows $60a...60n$. Each of the rows $60a...60n$ of the processing array includes processing elements $62a...62h$. In operation, the degree of numerical precision obtained by the random access processor 28 depends on the word length common to each of the processing elements in the array. It should be appreciated that the representation of the random access processor 28 in FIG. 3 is not meant to be limiting and that the present invention envisions a configuration of the random access processor 28 with any desired amount of processing elements, depending on the signal processing application.

As discussed above with respect to FIG. 2, the random access processor 28 receives configuration data from the CPU 48 via bus 55 Bus 55 is represented in FIG. 3 by the individual configuration data lines $55a...55n$. As will be described in more detail below, the configuration data is used to dynamically configure the random access processor 28 to provide signal processing functions not otherwise performable by prior art systolic arrays. FIG. 3 also shows the data lines $61a...61n$, which comprise a portion of the bus 36 as shown in FIG. 2. The data lines $61a...61n$ are used to transfer the coefficients generated in the array processor 50, or generated in other subarrays of the random access processor 28, from the multiport RAM 34 to the various processing elements of the random access processor 28. As also seen in FIG. 3, data input lines $63a...63n$ and data output lines $65a...65n$ comprise the remainder of the bus 36 as shown in FIG. 2 for transferring the input signal(s) between the random access processor 28 and the multiport RAM 34.

Figure 4:
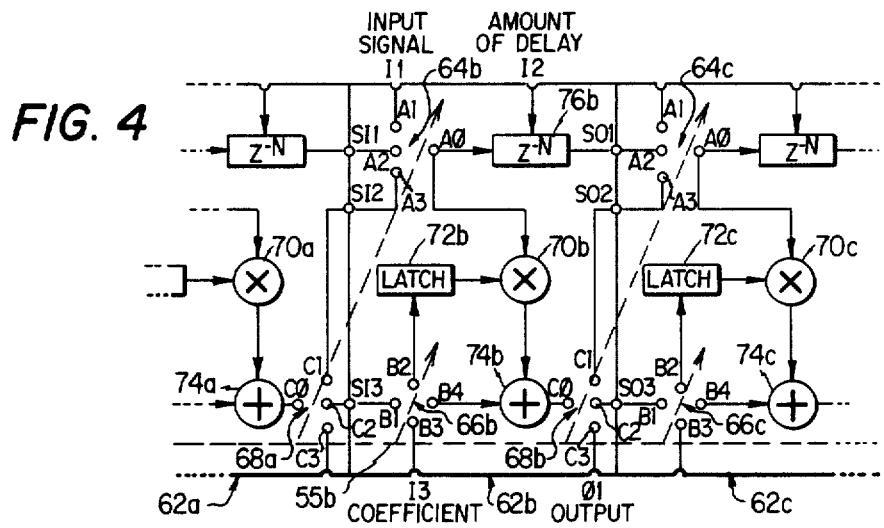
FIG. 4 is a block diagram of contiguous processing elements of the random access processor of FIG. 3.

Referring now to FIG. 4, a detailed schematic diagram is shown of contiguous processing elements $62a$, $62b$ and $62c$ of the random access processor 28 of FIG. 3. As discussed above with respect to FIG. 1, prior art systolic arrays are inherently unable to perform certain signal processing operations because the data and coefficient vector elements are clocked from one processing element to the next in typically one way, depending on the initial hard wired configuration. The present invention overcomes these and other limitations of the prior art through the use of configurable processing elements, e.g., processing element 62b in FIG. 4. This processing element includes three programmable switches, 64b, 66b and 68b. In operation, the states of the first, second and third programmable switches 64b, 66b and 68b of processing element 62b, respectively, are controlled by the configuration data generated by the CPU 48 and input thereto via line 55b.

Figure 5A:
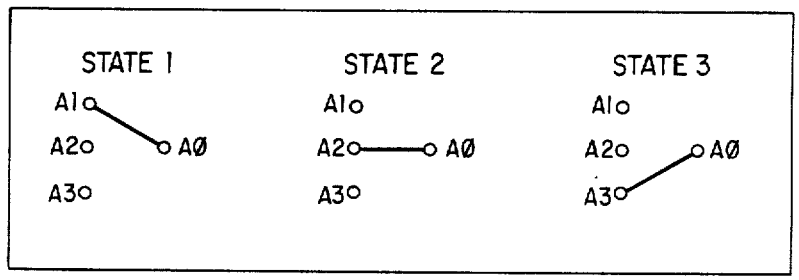
FIGS. 5A-5C are schematic diagrams of the operational states of first, second and third programmable switches in each of the processing elements of the random access processor of FIG. 3.
Figure 5B:
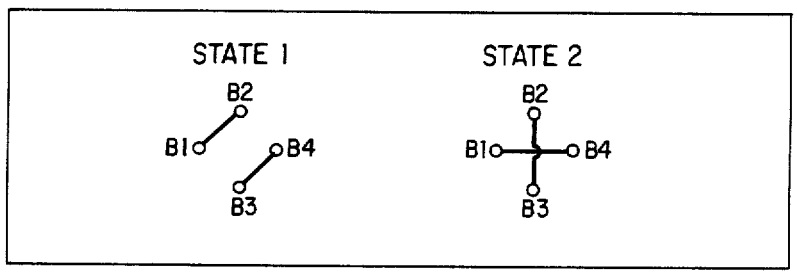
Figure 5C:
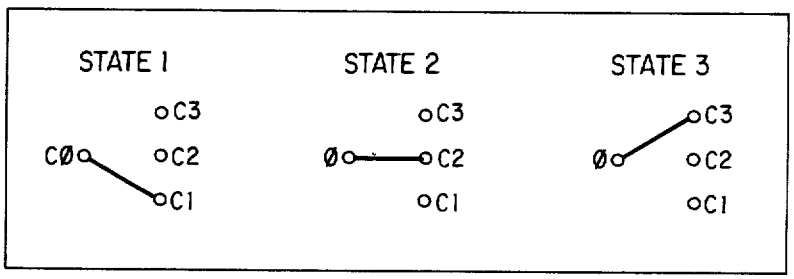

Referring briefly to FIGS. 5A–5C, schematic diagrams are shown detailing the operational states of the first, second and third programmable switches 64, 66 and 68, respectively, in each of the processing elements of the random access processor. As seen in FIG. 5A, the first programmable switch 64 has three input terminals A1–A3 and an output terminal A0, and thus first programmable switch has three possible operational states FIG. 5B diagrams the second programmable switch 66, which includes two input terminals B1 and B3, and two output terminals B2 and B4. In a first operational state, terminals B1 and B2 are connected together, as are terminals B3 and B4. In a second operational state, terminals B1 and B4 are connected together, as are terminals B2 and B3. Finally, as seen in FIG. 5C, third programmable switch 68 includes one input terminal C0 and three output terminals C1–C3, and thus third programmable switch has three possible operational states.

Referring now back to FIG. 4, the first programmable switch 64b of the processing element 62b is normally slaved to the third programmable switch 68a of a preceding contiguous processing element 62a in the array. As noted above with respect to FIG. 5C, switch 68a has one input terminal C0 and three output terminals C1–C3, with the terminals C(j) of switch 68a normally slaved to the terminals A(j) of the switch 64b, j = 1–3. The first programmable switch 64c of a next contiguous processing element 62c is slaved to the third programmable switch 68b of the processing element 62b in like fashion.

As also seen in FIG. 4, each of the processing elements 62a, 62b and 62c in the random access processor 28 are structurally and functionally identical. Processing element 62b includes a multiplier 70b having a first input connected to the output terminal A0 of the first programmable switch 64b, a second input and an output. Processing element 62b further includes a latch 72b having an input connected to the output terminal B2 of the second programmable switch 66b, and an output connected to the second input of the multiplier 70b. An adder 74b, which includes conventional latching and clock circuitry, is also provided in the element 62b. The adder 74b has a first input connected to the output of the multiplier 70b, a second input connected to the output terminal B4 of the second programmable switch 66b, and an output connected to the input terminal C0 of the third programmable switch 68b. The processing element 62b further includes a programmable delay element 76b having an input connected to the output terminal A0 of the first programmable switch 64b, a control terminal I2 for receiving configuration data, or other control data from the CPU 48, for setting an amount of delay thereof, and an output terminal connected to a first output S01 of the processing element 62b. The output S01 of the processing element 62b is connected to the input terminal A2 of the first programmable switch 64c in the next contiguous processing element 62c. The processing element 62b also includes a second output terminal S02 connected between the C3 output terminal of the third programmable switch 68b and the A3 input terminal of the first programmable switch 64c of the processing element 62c. A third output terminal S03 of the processing element 62b is connected between the C2 output terminal of the third programmable switch 68b and the B1 input terminal of the second programmable switch 66c of the processing element 62c. The processing element 62b also includes an output 01 connected to the C1 output terminal of the third programmable switch 68b.

The signal to be processed is clocked into the processing element 62b either through input port I1 from the multiport RAM 34 to input terminal A1, or through one of the ports SI1 or SI2 from the immediately preceding processing element 62a to input terminals A2 or A3, respectively. The first programmable switch 64b routes the input signal from the appropriate source port to the programmable delay element 76b and the multiplier 70b by providing continuity between the switch contacts A0 and one of the switch contacts A1, A2, and A3. As discussed above, the first programmable switch 64b of element 62b is normally slaved to the third programmable switch 68a in the preceding processing element 62a. This relationship, however, can be overridden by appropriate control data. The programmable delay element 76b receives its instructions through port I2, which may be physically connected to the configuration data line 55b. Preferably, the programmable delay element 76b is a shift register having N stages, such that the delay can be set between zero and any positive integer up to N.

As discussed above with respect to FIG. 5B, the second programmable switch 66b has two permissible states. In the first state, terminals B1 and B2 are connected together, as are terminals B3 and B4. In the second state, terminals B1 and B4 are connected together, as are terminals B2 and B3. Accordingly, in the first state, the output of the adder 74a of the previous processing element 62a is routed to the latch 72b and a coefficient input on input port I3 is routed to the adder 74b. In the second state, the coefficient for the multiplier 70b is provided from the coefficient port I3, and the signal from the immediately preceding processing element 62a on input port SI3 is routed through the adder 74b. If no signal is applied to ports I3 or SI3, then switch 66b feeds a "0" to the adder 74b in place of the undefined signal, or it feeds a "1" to the multiplier latch 72b in place of the undefined signal, depending on the state of switch 66b. The coefficients are normally supplied by the array processor 50 as discussed above with respect to FIG. 2.

The first, second and third programmable switches in each processing element of the random access processor facilitate the dynamic configurability thereof. For example, rather than simply moving the data and coefficient vector elements through contiguous processing elements in only one way depending on an initial hard-wired configuration, the states of the programmable switches are set by the configuration data to enable such data elements to dynamically move among all of the processing circuits in the processing element. This flexibility allows the random access processor 28 to perform linear and nonlinear operations on an input signal, thus providing increased signal processing capability over systolic arrays of the prior art.

Figure 6:
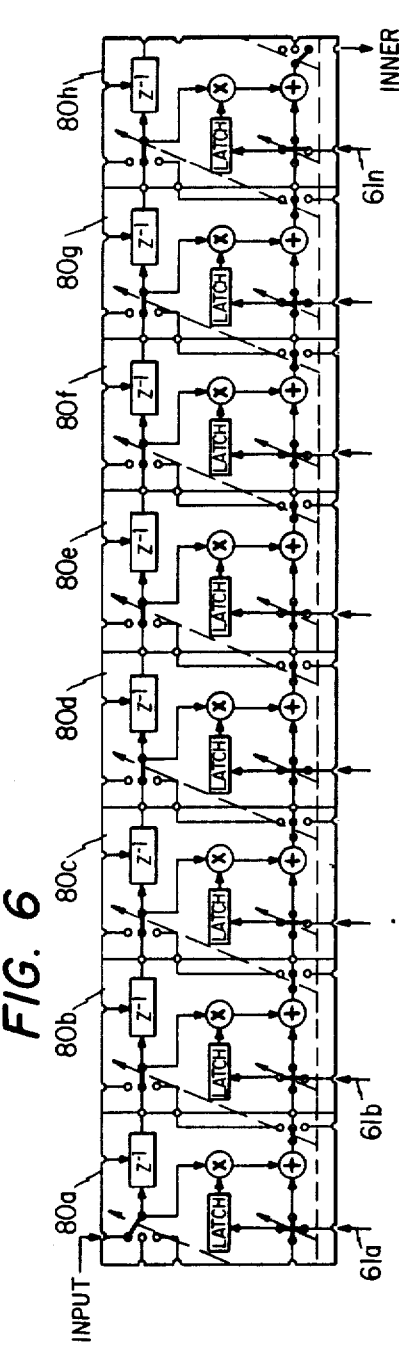
FIG. 6 is a block diagram of the random access processor of FIG. 3 configured to generate an inner product of two signal vectors.

With reference now to FIG. 6, the use of the random access processor 28 to form a linear transformation, such as an inner product, is shown. As seen in FIG. 6, an inner product is generated by setting the second programmable switch in each processing element $80a...80h$ to its second state and connecting the third programmable switch in each element (except element $80h$) between the terminals C0 and C2. Such connections allow the adders 74 of the random access processor to function as an accumulator, thus producing the inner product of the vector of coefficients input to the elements $80a...80h$ via bus 61 (lines $61a...61h$), with the signal vector input on the input I1 of processing element $80a$.

Figure 7:
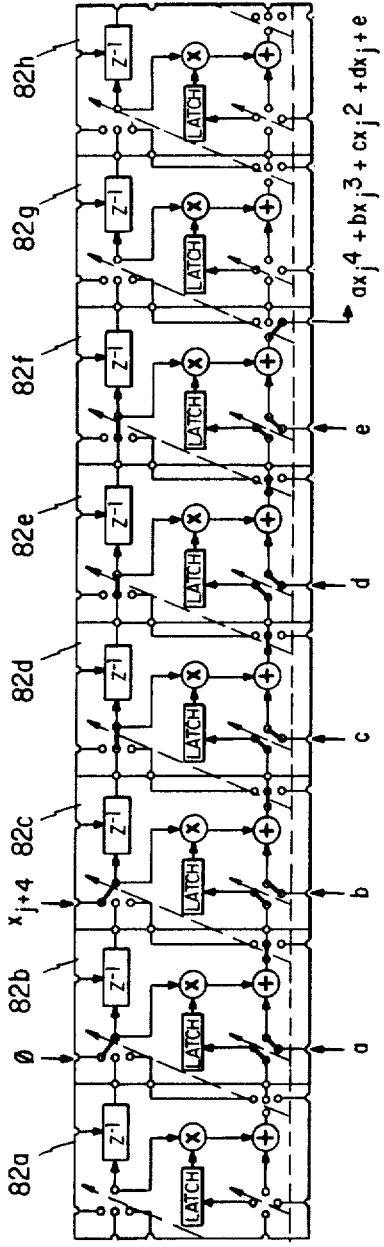
FIG. 7 is a block diagram of the random access processor of FIG. 3 configured as a polynomial transformer.
Figure 8:
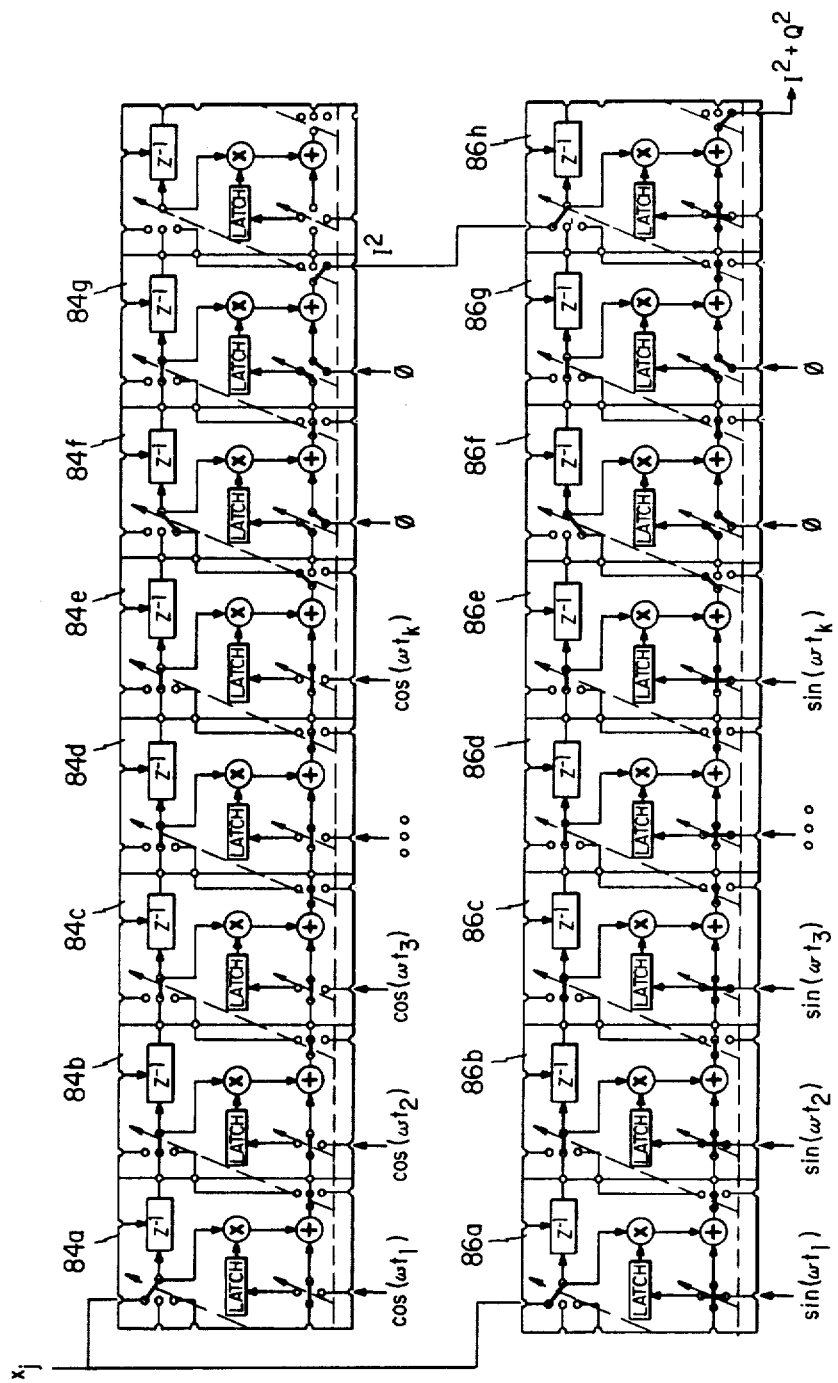
FIG. 8 is a block diagram of the random access processor of FIG. 3 configured as a detector having parallel finite impulse response (FIR) filters.
Figure 9:
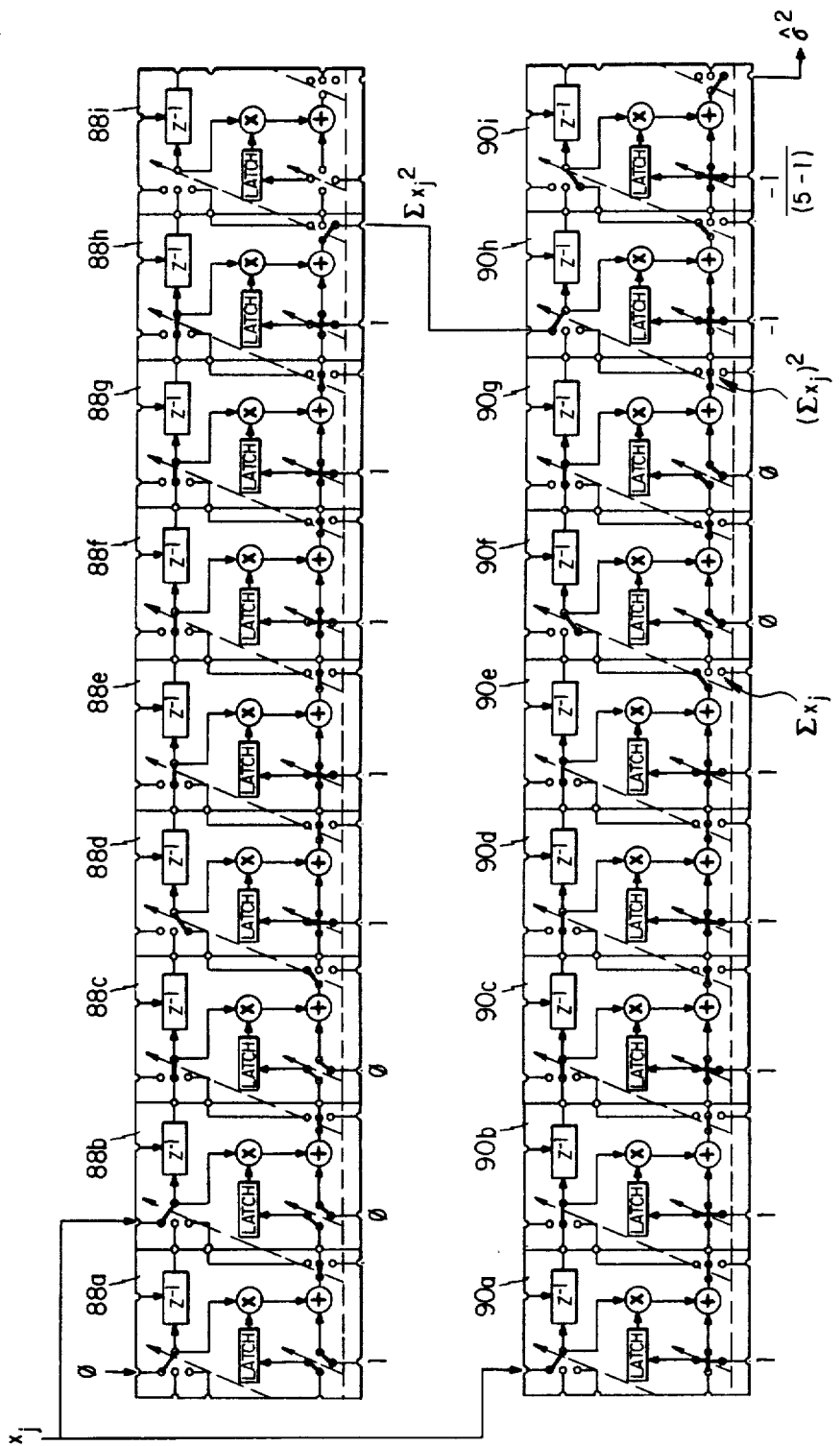
FIG. 9 is a block diagram of the random access processor of FIG. 3 configured as a Bayes variance estimator.

FIGS. 7, 8 and 9, respectively, show examples of the programmable switch settings and input signals that allow the random access processor 28 to function, respectively, as a polynomial transformer, a finite impulse response (FIR) filter for incoherent detection of a sinusoid with frequency $\omega$, and a Bayes estimator of the variance in consecutive samples of an input signal.

The polynomial transformer depicted in FIG. 7 implements the Horner algorithm for polynomial evaluation, which is well-known in the prior art. In this example, five coefficients "a-e" of the fourth order polynomial are loaded into the adders 74 of processing elements $82b...82f$ via coefficient ports I3. The output of each processing element is then fed to the latch 72 of a next contiguous processing element by setting (via the configuration data) the second programmable switches 66 to their first operational states. An input signal, e.g., $x_{j=4}$, is fed into the processing element $82c$ through switch 64, which is set by the configuration data into its first operational state. In operation, the input signal is then shifted through the contiguous processing elements with unit delay until the input signal reaches the processing element $82f$ holding the last coefficient "e". As seen in FIG. 7, the processing element $82b$ holding the coefficient "a" receives a datum "0" through switch 64, so that the value $a+0=a$ resides on the latch 72 in this processing element. A default value "1" resides in the latch 72 of the first processing element $82a$. After a delay of four clock cycles (corresponding to the polynomial of degree four), the output polynomial, $ax_j^4+bx_j^3+cx_j^2+dx_j+e$, is then output from the third programmable switch of processing element $82f$, and placed on the bus 36 connected to the multiport RAM 34 of FIG. 2.

The detector depicted in FIG. 8 implements two parallel FIR filters whose coefficients are the in-phase (I) and quadrature phase (Q) samples of a desired signal, $\cos(\omega t)$. EAch filter path, elements $84a...84e$ and $86a...86e$, respectively, is followed by a squaring function, elements $84f-84g$ and $86f-86g$, respectively. Note that the squaring function utilizes the subarrays configured as the polynomial transformer shown in FIG. 7. In particular, the three coefficients "a-c" required by a squaring polynomial are 1, 0, 0; however, a leading coefficient of unity ("1") need not be implemented, as it can be supplied by default to the latches in elements $84f$ and $86f$ and is consequently omitted from both squaring functions shown in FIG. 7. The squared in-phase component $I^2$ is output from the processing element $84g$, applied to the I1 input terminal of processing element $86h$, and then summed with the quadrature component $Q^2$, The output of the processing element $86h$ is the signal $I^2+Q^2$.

The Bayes estimator depicted in FIG. 9 computes the sample variance in the input signal stream x; by dividing the signal into two paths. In the upper path, the samples are first squared in processing elements $88a-88c$ using the polynomial transformer configuration of FIG. 7 with coefficients "1, 0, 0", and then summed in a five sample window, elements $88d-88h$, configured as the FIR filter of FIG. 8 with unit coefficients. In the lower path, the samples are first summed over the same length window, elements $90a-90e$, and then polynomial transformed in elements $90f-90$ with coefficients "1, 0, 0" (the leading unity coefficient being supplied by default as previously described), thus producing the square of the sum at the C0 terminal of switch 68 in processing element $90g$. The output of processing element $88h$ of the upper path is then subtracted from the square of the sum in processing element $90h$ by supplying a coefficient "$-1$" to the latch 72 therein. The resulting difference is then multiplied in element $90i$ with the negative reciprocal of one less than the length of averaging window to produce $\hat{\sigma}^2$, which is the minimum variance unbiased estimator for the variance in the input signal. This desired signal is then output from the third programmable switch 68 of element $90i$ and delivered to the multiport RAM 34.

It should be appreciated that the use of the random access processor 28 as shown in FIGS. 6-9 is not meant to be limiting, and that this processor may be used in various other configurations to provide a variety of signal processing functions. As seen by the above examples, the random access processor 28 is partitionable into various types of subarrays and each subarray can be declared to be a one dimensional array (a vector), or an n dimensional array (matrix) of processors analogous to the way in which a random access memory is partitioned and declared by application programs. These declarations are accomplished through the us of the programmable switches in each processing element, and through the configuration data which determines the way in which the signals are clocked into the adjacent processing elements and/or subarrays in the random access processor. The random access processor 28 can therefore be configured under the control of the configuration controller (compiler 46/CPU 48) into one or more individually addressable processing arrays to perform linear or nonlinear operations on one or more input signals. Linear operations performable by the random access processor include without limitation, inner products, matrix transformations, convolutions, and recursive and transversal filters. Nonlinear operations provided by the random access processor include, without limitation, the Bayes estimate of the variance in a segment of a signal, and polynomial functions.

In operation, high-speed input/output takes place only at the extremities of the random access processor 28, with low speed input/output performed at any processing element thereof All input/output to and from the random access processor, except configuration instructions, is by communication with the multiport RAM 34 As discussed above, configuration data is received from the CPU 48 as controlled by the compiler 46.

It can be seen that the adaptive processing system of the present invention provides processing capability otherwise unavailable with prior art systolic arrays. According to the present invention, the processing system provides real-time signal processing of one or more input signals in parallel-pipeline fashion utilizing a random access processor having an array of individually configurable processing elements. Each processing element includes programmable switches which are responsive to configuration data to define a configuration of the processing elements, and data flow between contiguous processing elements thereof, to enable processing of the input signals according to instructions input by a system operator. The adaptive processing system of the present invention also includes a man-machine interface for receiving instructions from the operator defining how input signals are to be processed by the random access processor. A configuration controller is also described, comprising a compiler and central processing unit, responsive to the man-machine interface for generating the configuration data.

Although the invention has been described in detail, it is to be clearly understood that the same is by way of illustration and example only and is not to be taken by way of limitation, the spirit and scope of the invention being limited only to the terms of the appended claims.

I claim:

1. A random access processor for real-time signal processing of an input signal, comprising an array having at least first and second contiguous processing elements, each of said processing elements including:
    first, second and third programmable switches, said first programmable switch of said second processing element slaved to said third programmable switch of said first processing element,
    a multiplier having a first input connected to an output of said first programmable switch, a second input and an output;
    a latch having an input connected to an output of said second programmable switch and an output connected to said second input of said multiplier;
    an adder having a first input connected to said output of said multiplier, a second input connected to an output of said second programmable switch, and an output connected to an input of said third programmable switch; and
    a programmable delay element having an input connected to an output of said first programmable switch, a control terminal for receiving data for setting an amount of delay provided by said programmable delay element, and an output.

2. An adaptive systolic array processing system for real-time signal processing of one or more input signals, comprising:
    a random access processor having an array of individually addressable processing elements that are contiguously arranged to process one or more inputs in a parallel-pipeline fashion, in which signals from processing elements are rhythmically clocked into adjacent processing elements through certain interconnected terminals of said processing elements, said processing element having a plurality of said terminals and a plurality of switches whereby said terminals may be selectively coupled internally to other terminals by operating said switches;
    configuration control means coupled to each of said processing elements to dynamically configure said processing elements by selectively operating said switches.

3. The adaptive processing system as described in claim 2, further including memory means connected to certain of said terminals of each of said processing elements.

4. The adaptive processing system as described in claim 3, wherein said configuration control means comprises signal database means for storing a set of all signal parameters for signals that may be processed by said system.

5. The adaptive processing system as described in claim 4, further including interface means for inputting instructions defining how said input signal is to be processed by said array.

6. The adaptive processing system as described in claim 5, wherein said configuration control means further comprises a compiler coupled to said signal database means and said interface means to interpret instructions from said interface means in terms of the set of all signal parameters stored in said signal database, to determine the operations to be performed by said random access processor and the necessary configuration data, and, if necessary, determining configuration data necessary to ascertain unknown or unspecified signal parameters to carry out said instructions.

7. The adaptive processing system as described in claim 6, wherein said configuration control means further comprises a central processing unit coupled to said processing elements to control said switches in response to said configuration data from said compiler means.

8. The adaptive processing systems as described in claim 3, wherein said memory means are also coupled to said configuration control means.

9. The adaptive processing system as described in claim 3, further including pre-processing means connected to said memory means for receiving said input signals and transferring signals to said memory means for storage.

10. The adaptive processing system as described in claim 3, further including post-processing means connected to said memory means for receiving a processed input signal and for generating an output signal from said signal.

11. The adaptive processing system as described in claim 3, further including array processing means connected to said memory means and controlled by said configuration means for generating filter coefficients for use by said processing elements.

12. The adaptive processing system as described in claim 2, wherein each of said processing elements includes means to perform arithmetic functions, through which selected of said terminals are coupled by operating said switches.

13. The adaptive processing system as described in claim 2, wherein each of said processing elements includes:
    multiplying means having a first input connected to a first switch, a second input and an output;
    storage means having an input connected to a second switch and an output connected to said second input of said multiplying means;
    adder means having a first input connected to said output of said multiplying means, a second input connected to said second switch, and an output connected to a third switch; and
    delay means having an input connected to said first switch, a control terminal for receiving configuration data for setting an amount of delay of said delay means, and an output.

14. An adaptive processing system for real-time signal processing of one or more input signals in parallel-pipeline fashion, comprising:
    an array of a plurality of individually addressable and configurable processing elements for receiving and processing said input signals, each processing element having a plurality of programmable switches and wherein selected programmable switches of adjacent processing elements are slave to each other, said processing elements contiguously arranged for data flow between elements for linear and non-linear operations;

interface means for inputting instructions defining the processing configuration of the individually configurable processing elements;

configuration control means coupled to said processing elements and said interface means and responsive to said interface means for generating configuration data defining the configuration of each element switch of said array to control data flow within and between contiguous processing elements thereof to enable processing of said input signal(s) by said processing elements according to the input instructions; and memory elements connected between said control means and said processing elements.

15. The adaptive processing system as described in claim 14 further including pre-processing means connected to said memory elements for receiving said input signal(s) and transferring said input signal(s) to said memory elements for storage.

16. The adaptive processing system as described in claim 14 further including post-processing means connected to said memory elements for receiving a processed input signal and for generating on output signal from said system.

17. The adaptive processing system as described in claim 14 further including array processing means connected to said memory elements and controlled by said configuration control means for generating filter coefficients for use by said processing elements.

18. The adaptive processing system as described in claim 14 further including signal database means connected to said interface means and said configuration control means for storing a set of all signal parameters which may be processed by said system.

19. The adaptive processing system as described in claim 14 wherein each of said processing elements includes:
   multiplying means having a first input connected to a first programmable switch, a second input and an output;
   storage means having an input connected to a second programmable switch and an output connected to said second input of said multiplying means;
   adder means having a first input connected to said output of said multiplying means, a second input connected to said second programmable switch, and an output connected to a third programmable switch; and
   delay means having an input connected to said first programmable switch, a control terminal for receiving configuration data for setting an amount of delay of said delay means, and an output.

20. An adaptive processing system for real-time signal processing of one or more input signals in parallel-pipeline fashion, comprising:
   a random access processor having an array of processing elements individually addressable and internally configurable for receiving and performing the parallel-pipeline processing of the one or more input signals;
   a man-machine interface for inputting instructions defining the processing configuration of the individually configurable processing elements;
   a signal data base connected to the man-machine interface for storing a set of all signal parameters processable by the system;
   a compiler coupled to the signal data base and responsive to the instructions from the man-machine interface for interpreting the instructions in terms of the signal parameters stored in the signal database and, in response thereto, for generating configuration signals for the array necessary to estimate unknown or unspecified signal parameters in the one or more input signals;
   a central processing unit responsive to the configuration signals from said compiler for generating configuration data defining the internal configuration of the elements of said array and coupling the configuration data to the random access processor for controlling data for flow within and between contiguous processing elements thereof to enable processing of the one or more input signals by the random access processor according to the input instructions;
   a multi-port random access memory (RAM) connected to the random access processor for providing storage for the central processing unit and a signal path bus for the one or more input signals to and from the random access processor; and
   a first parallel interface circuit connected to said multi-port RAM for receiving said one or more input signals and for providing pre-processing of said input signals.

21. The adaptive processing system as described in claim 20, wherein said random access processor includes at least first and second contiguous processing elements, each having first, second and third programmable switches, said programmable switches having operational states controlled by said configuration data.

22. The adaptive processing system as described in claim 21 wherein said first programmable switch of said second processing element is normally slaved to said third programmable switch of said first processing element 23. The adaptive processing system as described in claim 21 wherein each of said processing elements includes:
   a multiplier having a first input connected to said first programmable switch, a second input and an output;
   a latch having an input connected to said second programmable switch and an output connected to said second input of said multiplier;
   an adder having first input connected to said output of said multiplier, a second input connected to said second programmable switch, and an output connected to said third programmable switch; and
   a programmable delay element having an input connected to said first programmable switch, a control terminal for receiving configuration data for setting an amount of delay of said programmable delay element and an output.

24. The adaptive processing system as described in claim 20 further including a second parallel interface circuit connected to said multiport RAM for receiving said one or more input signals following processing thereof by said random access processor.

25. A random access processor for processing signals at high data rates comprising a systolic array of contiguously arranged processing elements, the processing elements coupled such that signals are clocked from one processing element into an adjacent processing element in a parallel-pipeline fashion, each processing element including programmable means for dynamically configuring a coupling of a signal input of the processing element, a signal output of the processing element, means for adding and means for multiplying, the configuration determining a processing function carried out by the processing element.

26. The random access processor for processing signals according to claim 25 wherein each processing element is further comprised of means for delaying a signal received by the processing element, and wherein the programmable means for selectively configuring a coupling couples the signal input, signal output, means for adding, means for multiplying and means for delaying.

27. The random access processor according to claim 26 wherein the means for configuring the coupling in each processing element of the systolic array is comprised of a plurality of programmable switches, each programmable switch having a plurality of predetermined states, the states determining the configuration of the processing element.

28. The random access processor according to claim 27 wherein the means for delay is programmable with a predetermined period of delay.

29. The random access processor according to claim 28 wherein the means for multiplying is programmable with a predetermined coefficient of multiplication.

30. The random access processor according to claim 25 wherein each processing element comprising the systolic array is coupled to an adjacent processing element in the array by a plurality of ports for receiving processed signals from the adjacent processing element, each port being coupled to the means for dynamically configuring the coupling of the signal input, the signal output, the means for adding and the means for multiplying.

31. A means for dynamically configuring a systolic array of processing elements for real-time digital signal processing of input signals with linear and nonlinear operation, comprising:
means for individually configuring a processing structure of each processing element in a systolic array of processing elements, the processing elements coupled for parallel-pipeline processing of digital signals with linear and non-linear operations, where a configuration of the structure of each of the processing element in the systolic array determines the operation performed by the systolic array;
memory means for transmitting to each processing element in the systolic array an input signal and for receiving from each processing element an output signal.

32. The means for dynamically configuring a systolic array according to claim 31 further comprising an array processor means for dynamically generating a coefficient of multiplication for each processing element, the means for dynamically generating coupled to the memory means.

33. The means for dynamically configuring a systolic array according to claim 32 further comprising:
a compiler for compiling a program from signal processing instructions;
signal data base means for storing a set of all signal parameters, the signal data base means coupled to the compiler; and
a central processing unit for executing the program and generating configuration data with which to configure each of the processing units, the central processing unit coupled to the memory means.

* * * * *

UNITED STATES PATENT AND TRADEMARK OFFICE
CERTIFICATE OF CORRECTION

PATENT NO. : 4,967,340

DATED : October 30, 1990

INVENTOR(S) : Robert L. Dawes

It is certified that error appears in the above-identified patent and that said Letters Patent is hereby corrected as shown below:

Column 2, line 62, before the second "of" insert --subarrays--.
Column 9, line 29, change "=" to "+".
Column 9, line 49, change "EAch" to "Each".
Column 10, line 7, change "90with" to "90g with".
Column 10, line 33, change "us" to "use".
Column 10, line 53, after "thereof" insert a period.
Column 14, claim 22, line 41, after "element" insert a period.
Column 16, claim 31, line 6, change "operation" to "operations".

Signed and Sealed this

Thirtieth Day of June, 1992

Attest:

DOUGLAS B. COMER

*Attesting Officer*     Acting Commissioner of Patents and Trademarks